United States Patent Office 3,165,745
Patented Jan. 12, 1965

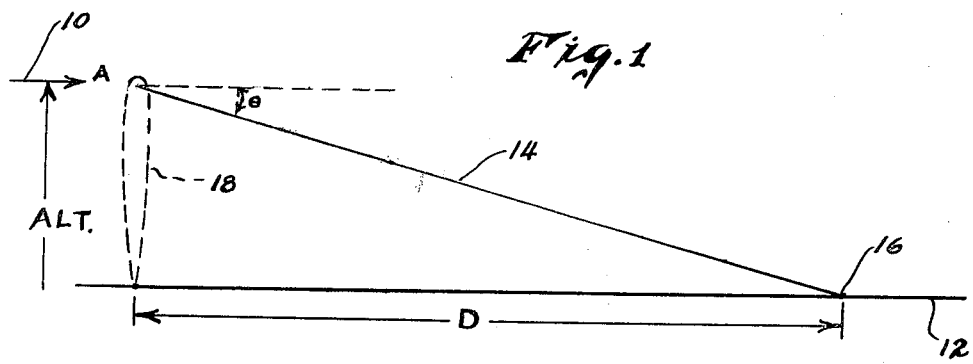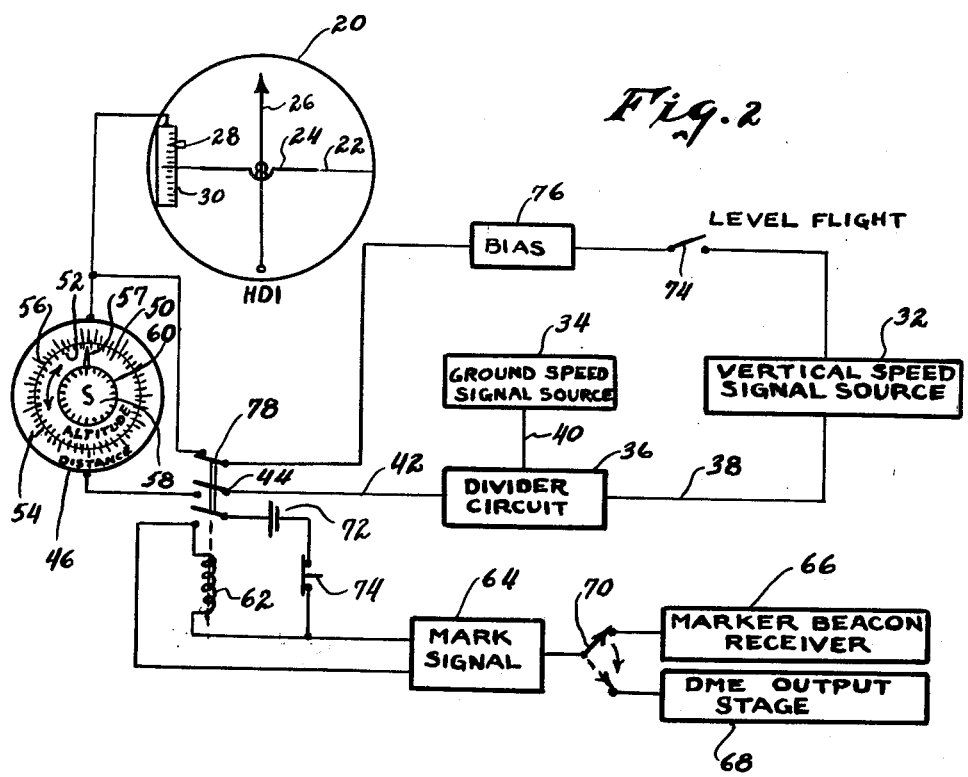
INVENTOR.
EDWARD W. PIKE
DAVID S. LITTLE
BY
ATTORNEYS

3,165,745
AIRBORNE GLIDE SLOPE DIRECTOR SYSTEM
Edward W. Pike, 135 Ellerman Ave., Twickenham, England, and David S. Little, 35 Bogart Ave., Port Washington, N.Y.
Filed Sept. 11, 1959, Ser. No. 839,354
4 Claims. (Cl. 343—108)

This invention relates to aircraft instrumentation, and more particularly to an airborne glide slope director system.

The art is familiar with glide path director display in the Instrument Landing System (ILS). In such systems, the glide path indicator is conventionally incorporated within a Horizontal Director Indicator (HDI). The glide path indicator displays deviation of the aircraft from the center of a radio beam transmitted from a ground based transmitter to direct the pilot along a predetermined glide path for a controlled instrument approach. Control of the landing approach by ILS is sufficiently precise and dependable for control of commercial traffic and is in widespread use in many airports, particularly in the United States.

Unfortunately, and often tragically, ILS is not always available when needed. The ground based transmitter installation is in all cases, expensive and, in many cases, precluded by ancillary considerations. The ground installation is expensive since a separate glide path transmitter is required for each glide path. Thus a separate transmitter is required at each end of each airport runway for all weather operation. Usually the cost of installation on all runways is prohibitive and only a few of the more active runways are properly equipped for ILS. When weather conditions preclude landing on the equipped runways, the aircraft is forced to land without instrument assistance.

Further, the terrain at the end of the runway often precludes the installation of an ILS transmitter. Obstructions and other terrain features, such as interfering structures acting as radio wave reflectors, will preclude installation of a glide path beam transmitter.

Additionally, many overseas airports are not equipped with ILS glide path transmitters. This is a severe handicap to military traffic particularly and hampers all weather operation.

It is therefore, one object of this invention to provide an airborne glide slope director system.

It is a further object of this invention to provide an airborne glide slope director for instrument approach without dependence on ground based equipment.

It is a further object of this invention to provide an airborne glide slope director, the indicator of which is energized by a signal derived from airborne equipment.

It is a still further object of this invention to provide airborne glide slope direction system using airborne sensors.

In accordance with these objects, there is provided in a preferred embodiment of this invention, a glide slope director system. The direction display indicator is the conventional glide path indicator incorporated in the Horizontal Director Indicator.

Two airborne sensors are provided to generate signals for driving the indicator.

One sensor generates a first signal responsive to rate of change of altitude of the aircraft.

The other sensor generates a second signal responsive to the ground speed of the aircraft.

The first and second signals are processed by a divider circuit to obtain a third signal, the amplitudle of which is proportional to the ratio between the first and second signals. The third signal is thus representative of the slope of the glide path and can be applied to the indicator to display the instantaneous glide slope.

A bias source is provided for the pilot so that a desired slope may be selected and the indicator display deviation from such selected slope.

Means are provided to couple the sensors to the indicator at a preselected distance of the aircraft from the desired point of touch-down.

By such means the director will engage properly and will direct the pilot along a preselected glide slope until visual contact with the airport is made.

Thus instrument controlled approach can be made on runways not provided with ILS transmitters.

A preferred embodiment of this invention is illustrated in the accompanying drawings, of which:

FIGURE 1 is a diagrammatic view of a typical glide path, which view is useful in the explanation of the present invention, and FIGURE 2 is a schematic diagram of an airborne glide path director in accordance with the present invention.

In FIGURE 1 there is shown an aircraft, represented by arrow 10, approaching an airport 12. The aircraft is at any altitude A. At any distance D from the airport runway, a line 14 can be drawn from the aircraft to the desired touch-down point 16, usually the end of the runway. By guiding the aircraft along a glide path coinciding with line 14, the aircraft may be directed to the touch-down position, properly. During conditions of low visibility guidance by instrument directors is necessary, such as, for example, by establishing the glide path by a radio beam transmitted from an ILS transmitter at the end of the runway.

In the present system, however, the ILS transmitter need not be present. It will be noted that the slope of the glide path is determined by the ratio of the altitude A to distance D.

The altitude is determinable within the limits of accuracy necessary for the present application by a precise altimeter such as that disclosed to the art in applications Serial No. 625,711 filed December 3, 1956, now U.S. Patent No. 3,013,434 for Automatic Indicating and Control Instrument.

The distance from the airport is determinable by airborne sensors. For example, the distance measurement may be made by the conventional Distance Measurement Equipment (DME). In the United States the network of DME stations will allow distance measurement from virtually all airports. Overseas, it may be advantageous to install a DME station at the field since the omnidirectional characteristics of the station may result in equipment economy over ILS installation.

Also distance determination may be made by the installation of a marker beacon transmitting along the approach at a predetermined distance from the touch-down point. The marker beacon 18 is easily received by the equipment of modern aircraft to directly determine the distance to the field. The marker beacon must be installed along each approach but is considerably cheaper than ILS and is not affected by terrain conditions to the same extent as ILS.

Thus, system flexibility is afforded. The pilot may selectably determine altitude, distance and the glide slope angle for the operational situation encountered. The pilot is not restricted to a specific glide path determined by an ILS beam. After selection of the desired glide slope, the director will display instantaneous slope in a form familiar to the pilot to control the approach until visual contact is made.

The glide sope director system for generating the necessary display is best understood by reference to FIGURE 2.

In FIGURE 2 there is shown a Horizontal Director Indicator 20. The HDI is of conventional form and presents a combined display comprising an attitude display, a heading director display, and a glide slope director display.

The attitude display, in the instrument illustrated, is of conventional presentation type. The horizon 22 rotates to give roll attitude information. The aircraft index indicator 24 moves vertically with respect to the horizon 22 to give pitch information. Thus both pitch and roll attitude information is displayed on the HDI.

A course or steering needle 26 of the Fly-To type presentation is provided to display heading information as, for example, during omnirange navigation and ILS approach.

A glide slope needle 28 moves vertically along scale 30 to indicate displacement from the glide path beam during ILS approach. The needle may be of the Fly-To or displacement-indicator type. In either case the display is such that the pilot merely aligns the wingtip of the indicator aircraft 24 with the needle for proper alignment with the glide path. When ILS is not available, the ILS receiver (not shown) will be disconnected and the airborne glide slope director system will be employed.

The airborne glide slope director system utilizes the same glide path needle as is used for the display of glide path information in the ILS approach system. The use of the same indicator obviates the need for pilot familiarization training and increases system safety since the pilot need not switch from one display system to another when he switches from one sensor system to another. The sensors deriving the signal to deflect the indicator are all airborne in the utilizing aircraft.

As can be seen from examination of FIGURE 1, the slope of the glide path is determined by Equation 1:

Equation 1

$$\text{Slope} = -\frac{dA}{dD} = -\frac{dA}{dt} \cdot \frac{dt}{dD}$$

As can be seen from Equation 1, the instantaneous glide slope is equal to the rate of change of altitude divided by the rate of change of distance.

An electrical signal responsive to the rate of change of altitude is derived from a vertical speed indicator 32. Exemplary of a satisfactory instrument is the instrument disclosed to the art in application for Letters Patent, Serial No. 839,238, filed September 10, 1959, now U.S. Patent Number 3,098,381, for Vertical Speed Indicator, in which the signal is derived from leads 46, 48, FIGURE 1.

A source of signals 34 responsive to rate of change of distance (ground speed) is provided. The source may conveniently be a ground speed measuring instrument such as a downward looking radar utilizing a Doppler frequency shift for measurement of ground speed.

The signal responsive to vertical speed and the signal responsive to ground speed is applied from sources 32 and 34 respectively to a divider circuit 36 over leads 38 and 40 respectively. The divider circuit will operate on the applied signals and will generate a direct voltage output signal, the amplitude of which is proportional to the ratio of the vertical speed signal to the ground speed signal and, thus, is proportional to the instantaneous glide slope of the aircraft.

The output signal from the divider circuit is transmitted to the glide slop display indicator by lead 42, switch 44 (when closed), and biasing network 46, to deflect the glide slope needle 28 in accordance with instantaneous glide slope traversed by the aircraft.

The biasing network 46 applies a bias signal variable as a function of the average slope (A/D) preselected by the pilot. The biasing network may most conveniently comprise a unidirectional potential source and a rheostat having a variable tap positioned along the rheostat by rotation of dial 50. The bias magnitude is adjusted with respect to the needle 28 deflection characteristics to center the needle when the instantaneous slope corresponds to the preselected slope. Therefore, deviation of the instantaneous slope from the average slope will be displayed as needle deflection from the center position. Thus the display is similar to that of the ILS display familiar to the pilot. The glide slope is easily tracked by aligning the wing of the index aircraft with the glide slope needle.

The biasing network 46 incorporates a simple computor scale arrangement for setting thereof. As mentioned previously, the glide slope and aircraft position on entering the glide slope is variable to suit the needs of the particular aircraft, the approach conditions of the airport, and the approach patterns established by convention. While such flexibility is extremely desirable, the pilot must be able to set the indicator bias in response to the variable factors simply and quickly. Further, the number of operating tasks required of the pilot during landing approach makes it desirable that all adjustments be performed prior to going downhill.

The computor dial arrangement on the bias source comprises a movable dial 50 having altitude scale index markings 52 imprinted thereon. The altitude scale is movable with respect to a stationary outer annular scale 54 having distance index markings 56 imprinted thereon. The rotatable scale is also provided with an internal index mark 57 movable along a stationary internal annular scale 58 with glide slope index markings 60 imprinted thereon.

In operation, the glide slope may be selected by the pilot in accordance with the aircraft characteristics or the glide slope established by approach convention. The index mark 57 will be set to the desired slope marking 60. The pilot may then select the approach altitude desirable for the approach conditions. Aligned with the selected altitude on scale 52 will be scale marking 56 representing the distance from the field at which the pilot must enter the glide slope. When this distance is indicated by the DME gear, the pilot may manually close switch 44 and simultaneously start downhill.

The proper bias of the indicator will cause the needle to deflect to the center of the scale if the aircraft is aligned with the glide slope and deflections of the aircraft from the desired slope will be indicated by needle deflection from such center position. The instantaneous slope of the path traversed by the aircraft will be continuously indicated since both the vertical speed and the ground speed are continuously measured by the sensors to generate the signal driving the indicator.

In another example, the distance from the field may be fixed by the position of an outer beacon marker. The altitude may be fixed by convention or by approach condition. In such case, the pilot will merely align the predetermined altitude marking 50 with the distance marking 56. The pilot will then maintain the selected altitude until the aircraft reaches the marker beacon. The pilot will then simultaneously close switch 44 and start downhill.

In such approaches, the heading will be established by other means known to the art, such as a gyrocompass. The heading may, of course, be conveniently displayed on the course needle 26 to shorten the scan required by the pilot for instrument observation during approach.

In many applications it is desirable to arrange for automatic coupling of the glide slope indicator at the proper time. In such cases switch 44 may be operated by a solenoid 62, closed at the proper time by an impulse supplied from a mark signal generator 64.

The signal generator will generate a pulse to close the solenoid in response to reception of a marker beacon signal by receiver 66 or by reaching of a predetermined time interval in the DME equipment 68 to which the generator 64 is selectively coupled by switch 70. The solenoid is of the electrical locking type so that once energized, the battery 72 will maintain the relay closed. A momentary break switch 74 is supplied to reset the solenoid.

Thus, in such applications where the automatic coupling of the glide slope indicator is desirable, the pilot need only set the instrument and fly the selected heading and altitude. At the proper time the glide slope indicator will be coupled to the airborne sensors and will deflect from the normal rest position (top of scale) to indicate the instantaneous slope of the aircraft. The pilot will then align the wingtip of the indicator aircraft with the needle and fly the instrument until visual contact with the ground is made. In this manner the instrument display is virtually identical with the display afforded by ILS. However, ground ILS equipment is not necessary and sensors for instrument flight may be carried by the aircraft. The possibility of increased all weather operation is enhanced. Further, the instrument employs components normally carried by aircraft equipped for instrument flight.

It has been found convenient and desired by the pilots that the vertical speed signal be selectively coupled to the glide path director during level flight. Such coupling is particularly valuable in the manual flying of jet aircraft when the indication of deviation from level flight is desirably presented in one instrument. In such applications, the vertical speed signal is coupled to the glide path indicator through switch 74, bias source 76, and switch 78. The manual switch 78 allows selective coupling of the signal. The normally closed switch on the relay provides display indications during level flight. The level flight signal will be removed from the glide path needle simultaneously with the application of the glide slope signal thereto.

Thus, during level flight the glide path indicator will deflect in accordance with deflection of the aircraft from level flight. However, as soon as the mark signal is applied to the relay solenoid, the level flight signal will be removed and the glide slope signal applied. To the pilot this display will appear similar to the intersection of the glide path beam in an ILS approach.

It will be understood that this invention may be variously embodied and modified within the scope of the subjoined claims.

What is claimed is:

1. An airborne glide slope director system comprising a horizontal director indicator having a glide slope director display, a first source of electric signals the amplitude of which is responsive to the vertical speed of the aircraft, a second source of electric signals the amplitude of which is responsive to the ground speed of the aircraft, a divider circuit to generate a third electric signal the amplitude of which is proportional to the ratio between said first and second signals, and means for coupling said third electric signal to said glide slope indicator.

2. A glide slope director in accordance with claim 1 which includes means for selectably biasing said indicator so that a central indication will represent the desired slope.

3. A glide slope display in accordance with claim 1 in which said indicator coupling means includes means responsive to a predetermined distance of the aircraft from the airport for coupling said third electric signal to said indicator.

4. A glide slope display in accordance with claim 1 in which said indicator coupling means includes means responsive to a marker beacon signal for coupling said third electric signal to said indicator.

References Cited in the file of this patent

UNITED STATES PATENTS

| | | |
|---|---|---|
| 2,217,404 | Hahnemann et al. | Oct. 8, 1940 |
| 2,364,102 | Sessums | Dec. 5, 1944 |
| 2,454,673 | Sanders | Nov. 23, 1948 |
| 2,830,291 | Hecht et al. | Apr. 8, 1958 |
| 2,896,145 | Snodgrass | July 21, 1959 |
| 2,923,000 | Wolinsky | Jan. 26, 1960 |

FOREIGN PATENTS

| | | |
|---|---|---|
| 497,930 | Great Britain | Dec. 28, 1938 |